United States Patent
Allen et al.

(10) Patent No.: US 10,262,381 B2
(45) Date of Patent: *Apr. 16, 2019

(54) REAL-TIME SOCIAL GROUP BASED BIDDING SYSTEM

(71) Applicant: INTERNATIONAL BUSINESS MACHINES CORPORATION, Armonk, NY (US)

(72) Inventors: Corville O. Allen, Morrisville, NC (US); Jeffrey D. Haggar, Holly Springs, NC (US); Eileen J. Min, Columbia, MD (US); Michael M. Skeen, Cedar Hills, UT (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,461

(22) Filed: Apr. 13, 2017

(65) Prior Publication Data

US 2017/0221157 A1    Aug. 3, 2017

Related U.S. Application Data

(63) Continuation of application No. 14/270,946, filed on May 6, 2014.

(51) Int. Cl.
*G06Q 50/00*    (2012.01)
*H04L 12/58*    (2006.01)
(Continued)

(52) U.S. Cl.
CPC .......... *G06Q 50/01* (2013.01); *G06F 17/2785* (2013.01); *G06Q 30/0239* (2013.01);
(Continued)

(58) Field of Classification Search
CPC ........ G06Q 30/00; G06Q 50/00; G06Q 50/01; G06F 17/00; G06F 17/2785
See application file for complete search history.

(56) References Cited

U.S. PATENT DOCUMENTS 6,230,185 B1 * 5/2001 Salas .................... G06F 17/3089
707/E17.116
8,032,411 B2 10/2011 Huh et al.
(Continued)

FOREIGN PATENT DOCUMENTS

EP         2546794 A1 * 1/2013 ............ G06Q 10/10
EP         2546794 A1   1/2013

OTHER PUBLICATIONS

"Chat Rooms Welcome AOL's Ad Drive." Wired, Conde Nast, Mar. 6, 1997, www.wired.com/1997/03/chat-rooms-welcome-aols-ad-drive/. (Year: 1997).*

(Continued)

*Primary Examiner* — Abby J Flynn
(74) *Attorney, Agent, or Firm* — Scully, Scott, Murphy & Presser, P.C.; L. Jeffrey Kelly, Esq.

(57) ABSTRACT

There are provided a system, a method and a computer program product for creating the social group whose participants are involved in an online conversation. The system aggregates data associated with the online conversation and a group profile, of the social group. The system determines, based on the online conversation data and the group profile, a context of the online conversation and a goal of the social group. The system receives, based on the determined context and the goal, a first bidding from each provider, the first bidding associated with the determined context and the goal, the each provider providing one or more of: goods, services or discounts associated with the context and the goal.

19 Claims, 9 Drawing Sheets

(51) Int. Cl.
*G06Q 30/06* (2012.01)
*H04L 29/06* (2006.01)
*G06Q 30/02* (2012.01)
*G06F 17/27* (2006.01)
*G06Q 30/08* (2012.01)

(52) U.S. Cl.
CPC ..... *G06Q 30/0269* (2013.01); *G06Q 30/0275* (2013.01); *G06Q 30/0611* (2013.01); *G06Q 30/08* (2013.01); *H04L 51/046* (2013.01); *H04L 51/32* (2013.01); *H04L 65/403* (2013.01)

(56) References Cited

U.S. PATENT DOCUMENTS

| | | | |
|---|---|---|---|
| 9,411,506 B1* | 8/2016 | Prado | G06F 3/04883 |
| 2008/0034040 A1* | 2/2008 | Wherry | G06Q 10/107 |
| | | | 709/204 |
| 2010/0287103 A1 | 11/2010 | Mason | |
| 2011/0055309 A1* | 3/2011 | Gibor | G06Q 30/02 |
| | | | 709/202 |
| 2013/0046609 A1* | 2/2013 | Grigg | G06Q 30/08 |
| | | | 705/14.34 |
| 2013/0060849 A1 | 3/2013 | Zimmet et al. | |
| 2014/0280053 A1* | 9/2014 | Derks | G06Q 10/10 |
| | | | 707/722 |

OTHER PUBLICATIONS

Dong, H., Cheung Hui, S., & He, Y. (2006). Structural Analysis of Chat Messages for Topic Detection (Tech.). School of Computer Engineering, Nanyang Technological University. (Year: 2006).*
Macmillan, D., et al., "Facebook to Debut Real-Time Bidding on Advertising Prices", Bloomberg News, Jun. 14, 2012, pp. 1-2.
"Amazon Local", Amazon Local Homepage, http://local.amazon.com/subscribe, last printed May 5, 2014, p. 1.
"About Us", Livingsocial Homepage, http://corporate.livingsocial.com/ourcompany/, last printed May 5, 2014, pp. 1-4.
"About Groupon", Groupon Homepage, http://www.groupon.com/press/about-groupon, last printed May 5, 2014, pp. 1-2.
List of IBM Patents or Patent Applications Treated as Related, dated Apr. 13, 2017, 2 pages.

* cited by examiner

REAL-TIME SOCIAL GROUP BASED BIDDING SYSTEM

BACKGROUND

This disclosure relates generally to a bidding process, and particularly to a bidding process for a social network group.

BACKGROUND OF THE INVENTION

A social network refers to a computing service provided by one or more hosting server devices. Via the social network, users can share their thoughts, feelings, and pictures, e.g., via postings, comments, instant messages, texts, emails, etc. Nowadays, users can communicate in real-time via an online chat application installed in their smartphones. Via the online chat application, the users can form a group. The users in the group can communicate in real-time via the online chat application.

SUMMARY

There are provided a system, a method and a computer program product for creating the social group whose participants are involved in an online conversation. In one embodiment, the system aggregates data associated with the online conversation and a group profile, of the social group. The system determines, based on the online conversation data and the group profile, a context of the online conversation and a goal of the social group. The system receives, based on the determined context and the goal, a first bidding from each provider, the first bidding associated with the determined context and the goal, the each provider providing one or more of: goods, services or discounts associated with the context and the goal.

In order to determine the context and the goal of the social group, the system analyzes, by using a natural language processing, the online conversation data and the group profile.

In one embodiment, a method for a bidding process for a social group comprises creating the social group whose participants are involved in an online conversation. Data associated with the online conversation and a group profile, of the social group is aggregated. A context of the online conversation and a goal of the social group determining, based on the online conversation data and the group profile are determined. One or more first biddings from one or more providers are received, based on the determined context and the goal. The first biddings are associated with the determined context and the goal. The one or more providers provide one or more of: goods, services or discounts associated with the context and the goal.

In one embodiment, a computer program product for a bidding process for a social group, comprises a computer readable storage medium. The computer readable storage medium is readable by a processing circuit and stores instructions run by the processing circuit. The instructions create the social group whose participants are involved in an online conversation. The instructions aggregate data associated with the online conversation and a group profile, of the social group. The instructions determine, based on the online conversation data and the group profile, a context of the online conversation and a goal of the social group. The instructions receive, based on the determined context and the goal, one or more first biddings from one or more providers. The first biddings are associated with the determined context and the goal. The one or more providers provide one or more of: goods, services or discounts associated with the context and the goal.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
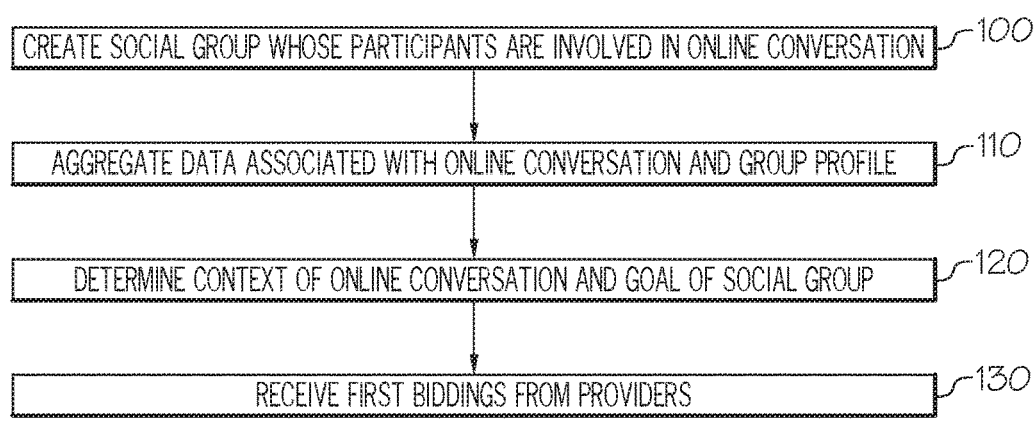
FIG. 1 illustrates a flowchart that describes a method for a bidding process for a social group in one embodiment.

A computing system (e.g., a computing system shown in FIG. 2; a server device hosing a social network) accesses profiles of users in the social network and further accesses real-time or stored online conversation data between those users. A profile of a social network user includes, but is not limited to: (1) an email address of the user; (2) a birth date of the user; (3) a mailing address of the user, etc. Online conversation data includes, but is not limited to: (a) an online chat history; (b) current real-time online chat data; (c) an online texting history; (d) current real-time online texting data; (e) an online instant messaging history; (f) current real-time online instant messaging data, etc. The profiles and the conversation data may be stored, e.g., in a data storage device of a server device hosting the social network. Companies may use these profiles and conversation data in order to advertise and/or to offer discounts targeted to a particular user(s) who are engaged in an online conversation (or online collaboration) as described below.

For instance, assume that a group of co-workers are chatting, via a social network, about where they'd like to go for lunch. They may discuss specific kinds of food or specific names of restaurants. The computing system (e.g., the server device hosting the social network, etc.) can provide opportunities to these restaurants (or their competitors) to offer immediate discounts or offers to this group. In order to provide these discounts or offers, the computing system may embed a real-time online bidding or a real-time online auction, which are provided from the restaurants, into the chatting being occurred in the social network. The computing system may embed the online bidding or the online auction into a data stream of an online social media (e.g., an online texting application, etc.) or a current online discussion or a current online forum. The social media, the online discussion or the online forum may include one or more real-time participants and may offer one or more group deals. In order to offer the group deals, the computing system determines a subject or keyword of the data stream, the current discussion or the current forum, e.g., by using a content analysis technique or text mining technique or a natural language processing technique. The computing system transmits, via one or more networks, the subject or keyword to service providers (or providers of goods). The service providers transmit the one or more group deals associated with the subject or keyword. Upon receiving the transmitted group deal, the computing system embeds the group deal in the data stream, the current online discussion or the current online forum. A group (or subgroup) of the participants accepts one group deal among the one or more group deals, e.g., by choosing a group deal that the most participants accept. The acceptance of the one group deal may also depend on the number of bidders, e.g., the service providers. The more bidders there exist in the online bidding or the online auction, the more group deals there exist in the online bidding or the online auction.

Figure 3:
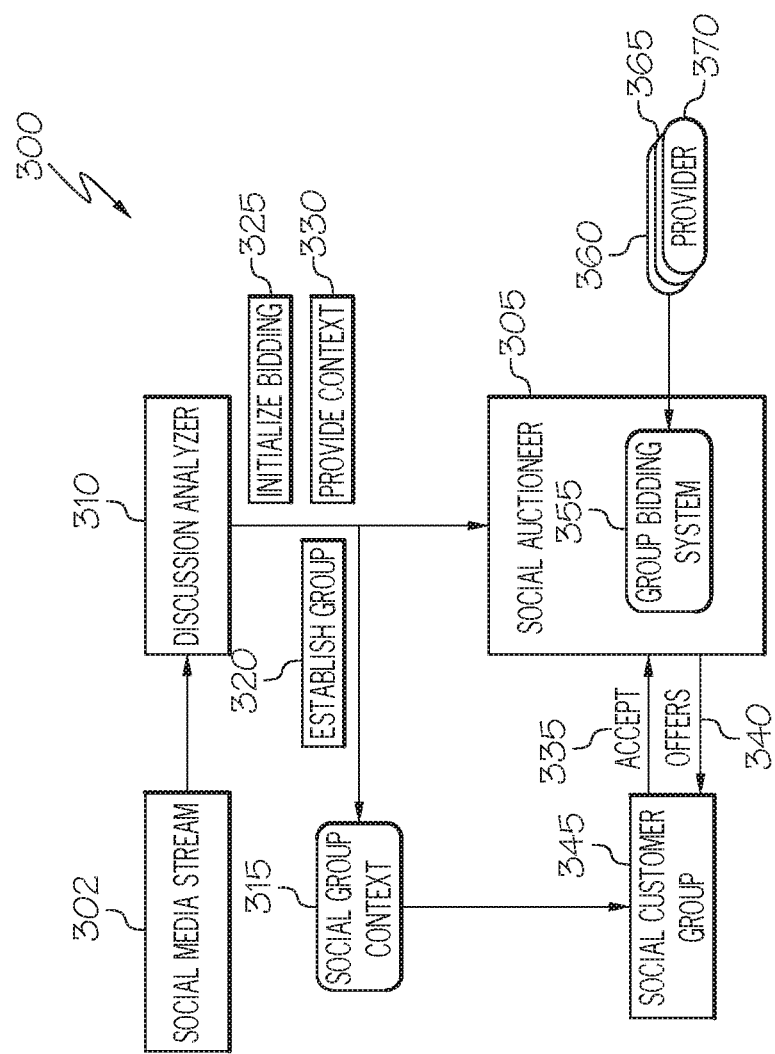
FIG. 3 illustrates a system diagram for a bidding process for a social group in one embodiment.

FIG. 1 illustrates a flowchart that describes a method for a bidding process for a social group in one embodiment. FIG. 3 illustrates a system 300 for the bidding process for the social group in one embodiment. The computing system may implement the system 300, e.g., by running a method shown in FIGS. 1 and/or 4 which are described below in detail. At 100 in FIG. 1, a discussion analyzer (e.g., a discussion analyzer 310 shown in FIG. 3) creates a social group whose participants are involved in an online conversation, based on one or more selections of members of the group which are made by one or more participants. For example, in order to create an online social group, a user selects one or more users who are registered in a same online social network as members. Those users may list themselves as friends ("contacts") in the social network. "Friends" refer to herein members in the social network to whom a user wants to share interests, thoughts or feelings, e.g., via postings, comments or instant messaging. In order to initiate an online social group conversation (e.g., an online conversation 525 shown in FIG. 5), a user may select "initiate a group talk" button (not shown) or the like provided by the social network. Then, that user may choose one or more users (or "friends") in the social network in order to have a real-time online chat as a social group.

At 110 in FIG. 1, the discussion analyzer accesses and aggregates data associated with the online conversation and/or a group profile, of the social group, which may be available in the server device which hosts the social network. The social group profile includes, but is not limited to: an accumulation of individual profiles of the participants; an online conversation history of one or more of the participants. The aggregation of the online conversation data and the group profile includes, but is not limited to: (1) the online conversation data itself; (2) metadata associated with the online conversation data; (3) data representing each time and date at which the online conversation occurred; (4) data representing interests of the group; (5) data associated with social network postings made by one or more participants in the social group; and (6) data representing a location(s) of one or more participant in the social group, etc.

At 120 in FIG. 1, the discussion analyzer determines a context (e.g., a social group context 315 shown in FIG. 3) of the online conversation and a goal of the social group and a need of the social group, e.g., by running a content analysis or a natural language processing over the aggregation of the conversation data and the group profile. For example, by running a natural language processing or a content analysis over current real-time online conversation data (which may occur by exchanging texts) of the social group, the discussion analyzer obtains a keyword or a subject or a summary of the current real-time online conversation data. The keyword, the subject or the summary may represent the context, the goal or the need of the social group.

At 130 in FIG. 1, a social auctioneer (i.e., the server device hosting the social network at which the online conversation occurs; e.g., social auctioneer 305 shown in FIG. 3) receives, based on the determined context and the goal, one or more first biddings (e.g., offers 340 shown in FIG. 3) from one or more providers (e.g., providers 360-370 shown in FIG. 3), e.g., via a group bidding system 355 shown in FIG. 3. The one or more providers may register in the group bidding system in order to transmit one or more group deals to the social group. The group bidding system may have a plurality of classes, each of which lists a plurality of providers specialized for one or more services, goods, etc. Each class may represent a particular goods or service. Each class may include one or more providers who supply corresponding particular goods or service. Providers in a class, which corresponds to the keyword or the subject or the summary, determine the first biddings. Those providers provide one or more of: goods, services or discounts associated with the context and the goal and the need of the social group. For example, if the keyword or the subject of the online conversation data includes "lunch" and "restaurant," the social auctioneer may search the group bidding system which may include a class of providers registered to provide luncheon service. The social auctioneer may contact, e.g., via an instant messaging, the luncheon service providers registered in the group bidding system. The luncheon service providers transmit the first biddings to the social auctioneer, which is the middle man between the social group and the luncheon service providers. In one embodiment, each provider transmits one first bidding to the social auctioneer. The social auctioneer embeds the transmitted first biddings to the online conversation of the social group (e.g., a social group 345, shown in FIG. 3, participated to the online conversation) in real-time. The first biddings from the one or more providers include, but are not limited to: (1) one or more offers for the goods, the services or the discounts, related to the context, the goal and/or the need; and (2) one or more advertisement(s) or discount offer(s), related to the context, the goal and/or the need, etc.

Figure 8:
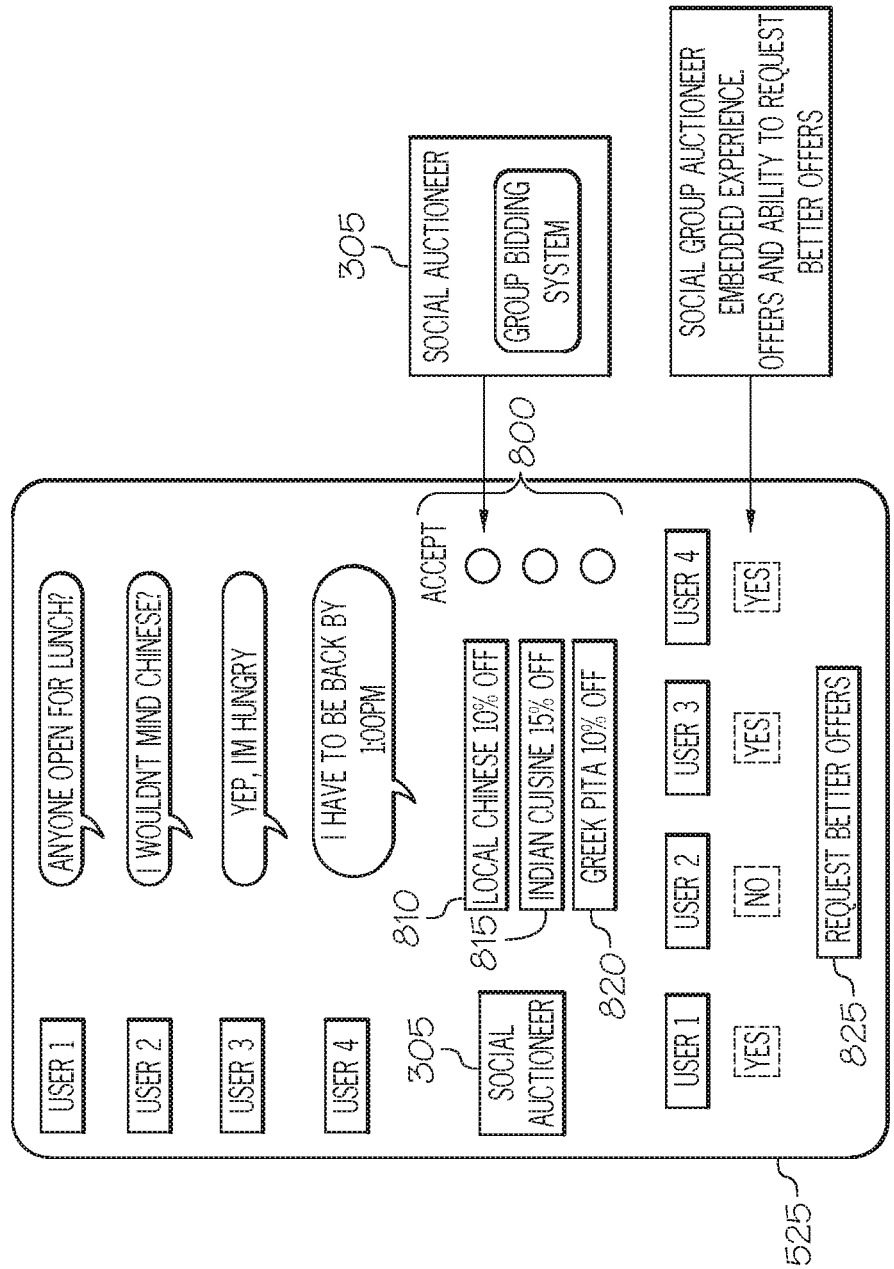

In one embodiment, the social auctioneer (e.g., the social network used by the participants in order to have the online conversation, etc.) embeds the first biddings into the online conversation as shown in FIG. 8. In FIG. 8, the social auctioneer 305 embeds the first biddings 810, 815 and 820 in the online conversation 825. As shown in FIG. 8, the social auctioneer 305 presents each offer (e.g., first biddings 810, 815 and 820) to a social group (user 1, user 2, user 3, and user 4) within a same discussion thread (e.g., the online conversation 525), e.g., by using embedded experience which allows the social auctioneer to insert contents to one or more software applications.

Figure 4:
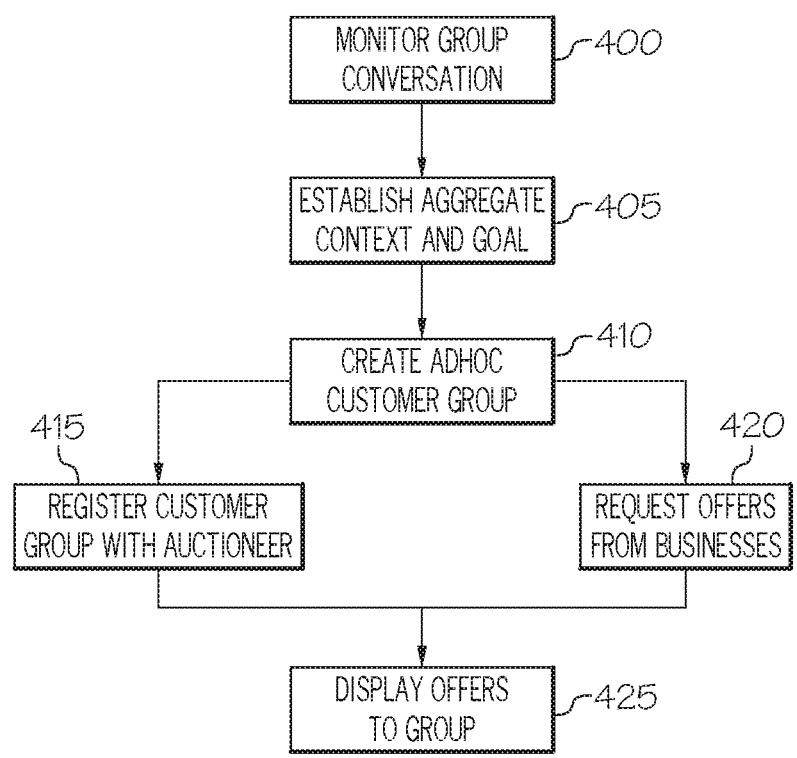
FIG. 4 illustrates a flowchart that describes a method for a bidding process in on embodiment.

FIG. 4 illustrates another flowchart that describes method steps for a bidding process for a social group in one embodiment. FIG. 3 illustrates the system 300 for this bidding process for the social group in one embodiment. At 400 in FIG. 4, the discussion analyzer monitors an online conversation which is being occurred in a social network, e.g., by using a software application that captures or intercepts corresponding data streams (e.g., data streams 302 shown in FIG. 3 which may encode texts (or audio data) being exchanged during the online conversation), e.g., from smartphones. At 405 in FIG. 4, the discussion analyzer aggregates (e.g., collects, etc.) data included in the monitored online conversation, e.g., the online conversation data described above. At 410 in FIG. 4 and at 320 in FIG. 3, the discussion analyzer establishes a social network group which may include participants of the online conversation. At 315 in FIG. 3, the discussion analyzer determines the context, the goal and/or the need of the social network group, e.g., by running a natural language processing technique or a content analysis technique over the online conversation data. At 325 in FIG. 3, the discussion analyzer provides the context, the goal and/or the need of the social network group to the social auctioneer. At 330 in FIG. 3 and at 415-420 in FIG. 4, the discussion analyzer notifies the social auctioneer that the social network group requests a bidding process associated with the context, the goal and/or the need. The social auctioneer requests offers (i.e., the first biddings) from providers who are listed on the group bidding system as providers of the services and/or goods associated with the context, the goal and/or the need. At 425 in FIG. 4, the providers deliver the offers to the social network group. For example, the providers transmit the offers to the social auctioneer, e.g., by sending data, which represent the offers, from the providers to the social auctioneer. The social auctioneer displays the data representing the offers during the online conversation in real-time to the social network group, e.g., via smartphones or display devices used by the participants of the social group.

The social auctioneer may further receive one or more second biddings from one or more of the providers registered in the group bidding system. The one or more second biddings may outbid one or more of the first biddings. Upon receiving the one or more second biddings, the social auctioneer may notify other providers, who did not tender the second biddings, that the one or more of the providers offered the second biddings. The social auctioneer provides an opportunity to the other providers to offer second biddings. The social auctioneer presents the first biddings and all the second biddings from providers who offered any second bidding. The social auctioneer and/or one or more of the participants in the social group requests third biddings from the providers who tendered the first biddings and/or the second biddings.

Figure 9:
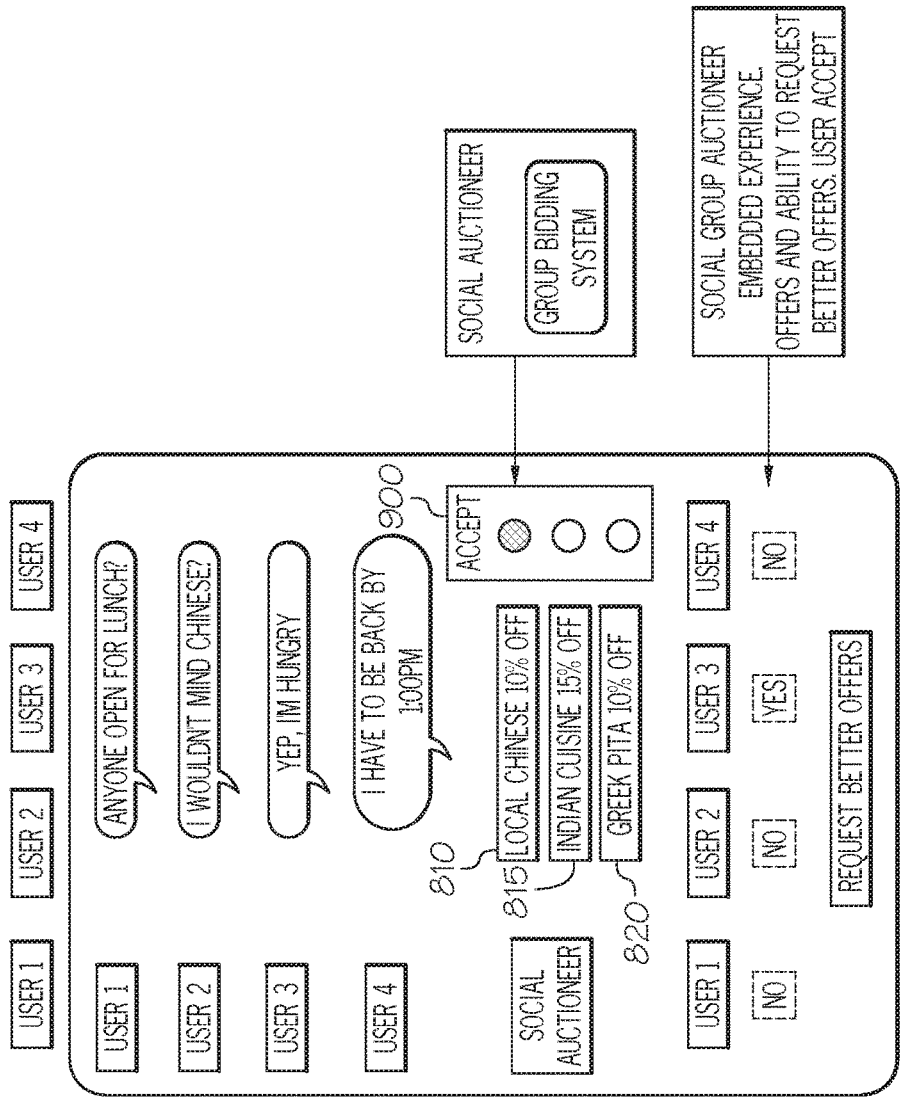

Each participant (or one or more participants) of the social group may choose (e.g., accepts 335 shown in FIG. 3) one of all the biddings, which include the first biddings and the second biddings and the third biddings, e.g., as shown in 900 in FIG. 9. The social auctioneer collects each chosen bidding. For example, each participant (or one or more participants) of the social group selects a bidding as his/her choice, e.g., by selecting an "accept" button of the chosen bidding as shown at 900 in FIG. 9. The server device, which hosts the social network which acts as the social auctioneer, receives data representing that a corresponding participant(s) chose particular bidding(s), e.g., via one or more communication network(s). The social auctioneer determines a bidding, among the collected chosen biddings, which is chosen by the most participants in the social group. The social auctioneer transmits, based on the determined bidding, a request for a payment for the determined bidding and a coupon (e.g., an offer 815 shown in FIG. 9) associated with the determined bidding to each participant (or one or more participants randomly chosen) in the social group. Validity of the coupon may be subject to a total number of the participants in the social group. For example, if the number of participants in the social group is less than a particular number, a provider which issued the coupon may not accept (i.e., does not validate) the coupon. In another embodiment, if the number of participants, who finally join an event associated with the coupon, is less than a particular number, that provider may not accept the coupon. The social auctioneer provides each participant in the online conversation with an option to select whether to participate in receiving one or more offers (e.g., offers 810-820 shown in FIG. 8) from the providers, choosing one or more of the offers as shown at 900 in FIG. 9, and transmitting his/her choice, e.g., by sending data representing the choice to the social auctioneer.

Figure 5:
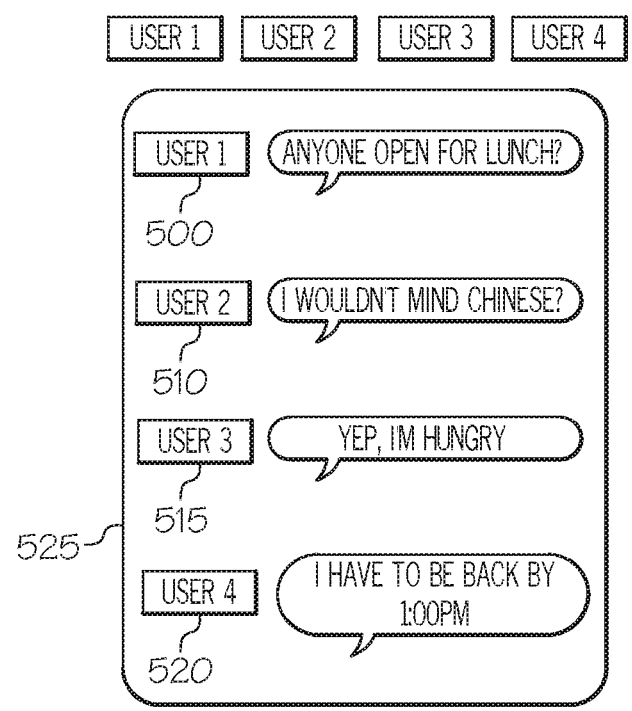
FIGS. 5-9 illustrate an example scenario that employs the flowchart in FIG. 1 and/or FIG. 4 in one embodiment.
Figure 6:
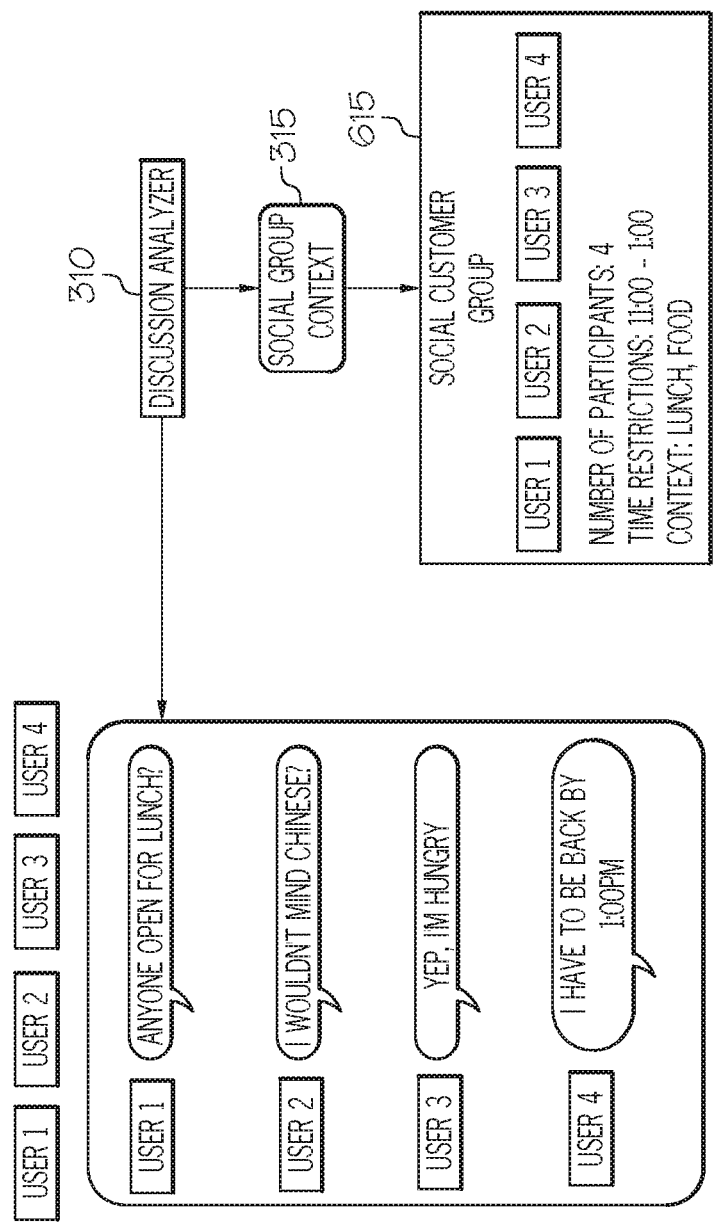
Figure 7:
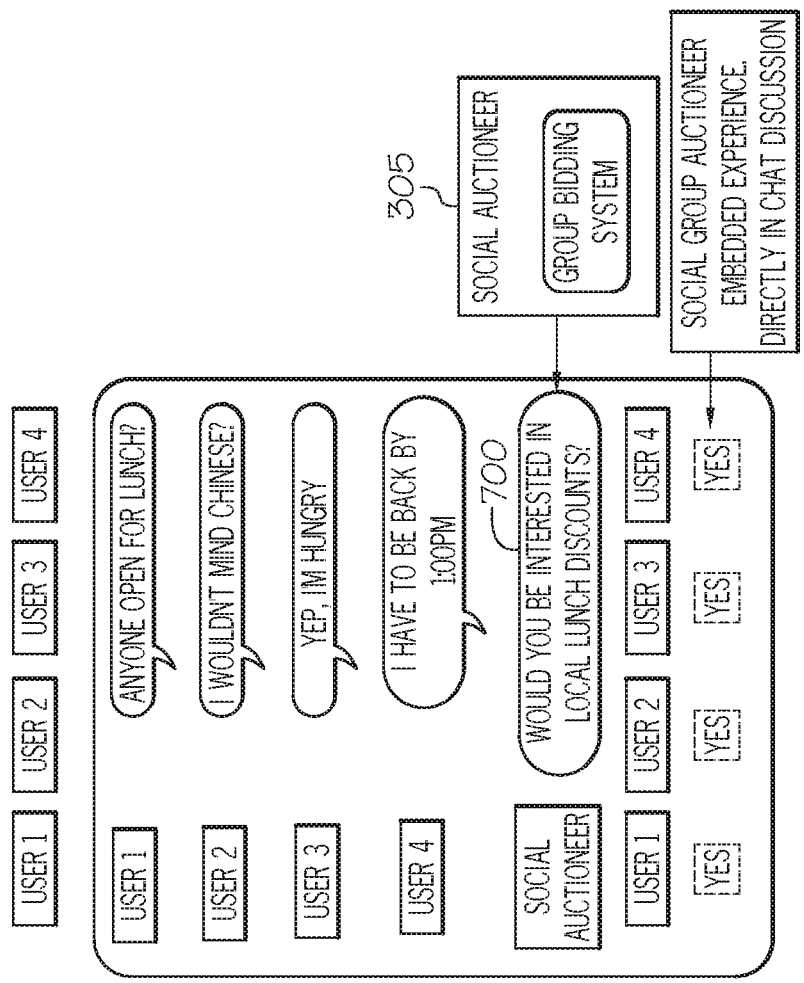

FIGS. 5-9 illustrate an example scenario that employs the method shown in FIG. 1 or FIG. 4. In FIG. 5, the server device (e.g., a computing system shown in FIG. 2) hosting the social network tracks and aggregates a real-time online conversation 525 between users 500-520 in a social network. In FIG. 6, the discussion analyzer 310 determines a common context and goal 315 of the conversation. The discussion analyzer establishes a social group 345 which represents the context and the goal and whose members include the users. The discussion analyzer may establish the social group in real-time based on the very current need (e.g., lunch). The need may reflect a social aspect of peer pressure (i.e., a social effect that encourages the users to change their behaviors to comply with a standard or a decision of the social group). The social auctioneer 305 receives data representing the social group 345. In FIGS. 7-8, based on that context, the goal and/or the need, the social auctioneer initiates a real-time bidding interaction 700 between service/goods providers and the individuals, e.g., by using an embedded experience technique in order to embed a real-time bidding process 800 into the online conversation 525. Through this real-time bidding, the social network or affiliate provides the bidding process for goods or services to the users. The service/goods providers may receive one or more anonymous requests for a better offer 825 from one or more of the users. The service/goods providers provide competitive bids or discounts 810-820 to the users. In FIG. 9, one or more of the users or a majority of the users accept 900 a bid or discount among the provided bids or discounts 810-820.

By employing the method shown in FIG. 1 and/or FIG. 4, the providers may increase a likelihood of sale of their goods and/or services. The social network provides a means for the social group to collaborate ideas or thoughts of users in the social group. The social network provides an in-place bidding system, e.g., by embedding a bidding process in a real-time online conversation, to users in the social network. The social group looks at those offers/discounts in real-time, makes a decision (e.g., chooses a bid, etc.) in real-time, and buy a corresponding coupon associated with the group decision in real-time.

The providers, which include winning bidder and losing bidders, advertise goods and/or services to the users in the social network. The social network aggregates users' profiles and conversation contents to provide opportunities to businesses for a real-time bidding and/or to offer targeted advertising and discounts (e.g., advertising and/or discounts associated with a keyword or subject of the conversation contents) to a group of corresponding social network users. The method shown in FIG. 1 and/or FIG. 4 allows companies to deliver offers, on the fly, to users engaged in an online conversation, whose profile meets (targeted) criteria of advertisements of the companies. The social network determines the need(s) of a social network group, e.g., by running a natural language processing over the conversation contents. Based on that need(s), the social network proceeds a bidding process with users in the social network group which participates in the bidding process as a group.

Figure 2:
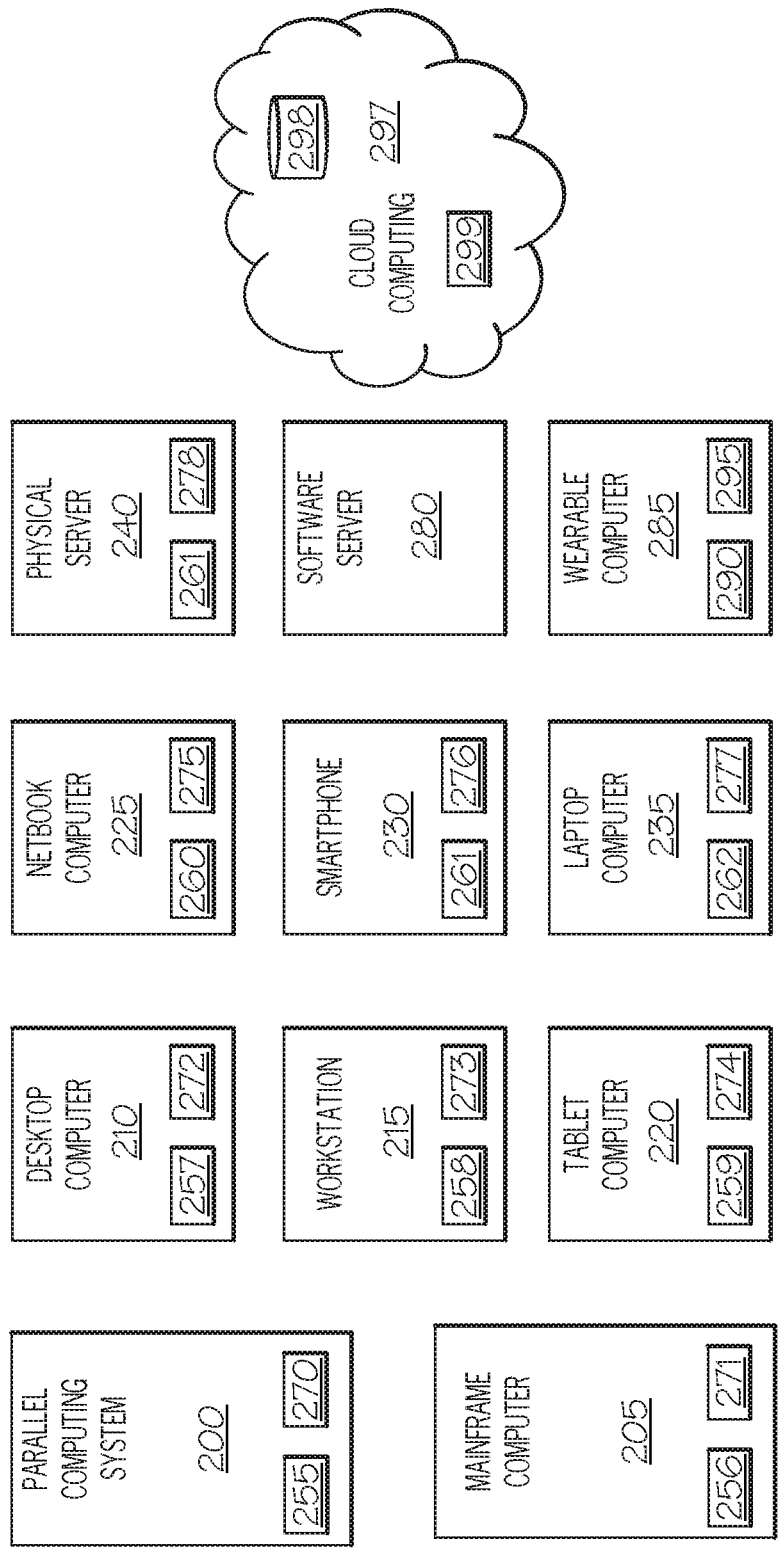
FIG. 2 illustrates exemplary hardware configurations for performing methods shown in FIG. 1 and FIG. 4 in one embodiment.

In one embodiment, a computing system may run the method illustrated in FIGS. 1 and 4. FIG. 2 illustrates examples of the computing system. Examples of the computing system may include, but are not limited to: a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 256 and at least one memory device 274, a netbook computer 225 including at least one processor 260 and at least one memory device 275, a smartphone 230 including at least one processor 261 and at least one memory device 276, a laptop computer 235 including at least one processor 262 and at least one memory device 277, a physical server 240 including at least one processor 261 and at least one memory device 278, a software server 280, e.g., web server, HTTP server, application server, or a wearable computer 285, e.g., smartwatch, etc., including at least one processor 290 and at least one memory device 295.

In one embodiment, the methods shown in FIGS. 1 and 4 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1 and 4 may be implemented on a semiconductor chip, e.g., ASIC (Application-Specific Integrated Circuit), by using a semi custom design methodology, i.e., designing a semiconductor chip using standard cells and a hardware description language.

In one embodiment, the system 300 shown in FIG. 3 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the system 300 shown in FIGS. 1 and 4 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for a bidding process for a social group, the system comprising:
   a memory device;
   a processor connected to the memory device, wherein the processor is configured to perform:
      creating the social group whose participants are involved in an online conversation;
      determining, based on online conversation data, a context of the online conversation;
      embedding in real time, in response to determining the context of the online conversation, a request to initiate a real-time bidding interaction in a data stream of the online conversation, wherein content of the request to initiate the real-time bidding interaction is inserted into a discussion thread inline with the online conversation of the social group;
      presenting on a user interface of a display device, the discussion thread in real-time with the inserted request to initiate the real-time bidding interaction and selectable elements enabling the participants of the social group to respond to the request to initiate the real-time bidding interaction;
      receiving, in response to the request to initiate the real-time bidding interaction, a real-time response from the participants of the social group;
      requesting, as a result of the real-time response from the participants of the social group, biddings from at least one provider;
      receiving, in response to the request for biddings from the at least one provider, at least one first bidding from the at least one provider, the at least one first bidding associated with the determined context of the online conversation, the at least one provider providing at least one item associated with the context of the online conversation;
      embedding in real-time, in response to receiving the at least one first bidding from the at least one provider, the at least one first bidding in the data stream of the online conversation, wherein content of the at least one first bidding is inserted into the discussion thread of the online conversation inline with the online conversation of the social group;
      presenting on the user interface of the display device, the discussion thread in real-time with the inserted at least one first bidding and at least one selectable element enabling the participants to respond to the at least one first bidding from the at least one provider, the at least one selectable element enabling participants to at least one of accept the at least one first bidding, not accept the at least one first bidding and request a better bidding.

2. The system according to claim 1, wherein the least one first bidding from the at least one provider comprises at least one of:
   an offer for goods, services or discounts, related to the context; and
   an advertisement or a discount offer, related to the context.

3. The system according to claim 1, wherein in order to determine the context, the processor is configured to perform:
   analyzing, by using natural language processing, the online conversation data.

4. The system according to claim 1, wherein the processor is further configured to perform:
   receiving at least one second bidding from at least one second provider;
   notifying other providers that the at least one second provider offered the at least one second bidding, the notified other providers not including the at least one second provider from which the at least one second bidding was received.

5. The system according to claim 4, wherein the processor is further configured to perform:
   providing an opportunity to the other providers to offer additional second biddings; and
   presenting, in the online conversation, the at least one first bidding, the at least one second bidding and any additional second biddings.

6. The system according to claim 5, wherein the processor is further configured to perform:
   choosing, by each participant of the social group, one of all the biddings, which include the at least one first bidding, the at least one second bidding and any additional second biddings;
   collecting each chosen bidding;
   determining a bidding, among the collected chosen biddings, which is chosen most by participants in the social group;
   transmitting, based on the determined bidding, a request for a payment for the determined bidding and a coupon associated with the determined bidding to the each participant in the social group.

7. The system according to claim 6, wherein validity of the coupon is subject to a total number of the participants in the social group.

8. A computer program product for a bidding process for a social group, the computer program product comprising a computer readable storage medium, the computer readable storage medium excluding a propagating signal, the computer readable storage medium readable by a processing circuit and storing instructions run by the processing circuit for performing a method, said method comprising:
creating the social group whose participants are involved in an online conversation;
determining, based on online conversation data, a context of the online conversation;
embedding in real time, in response to determining the context of the online conversation, a request to initiate a real-time bidding interaction in a data stream of the online conversation, wherein content of the request to initiate the real-time bidding interaction is inserted into a discussion thread inline with the online conversation of the social group;
presenting on a user interface of a display device, the discussion thread in real-time with the inserted request to initiate the real-time bidding interaction and selectable elements enabling the participants of the social group to respond to the request to initiate the real-time bidding interaction;
receiving, in response to the request to initiate the real-time bidding interaction, a real-time response from the participants of the social group;
requesting, as a result of the real-time response from participants of the social group, biddings from at least one provider;
receiving, in response to the request for biddings from the at least one provider, at least one first bidding from the at least one provider, the at least one first bidding associated with the determined context of the online conversation, the at least one provider providing at least one item associated with the context of the online conversation;
embedding in real-time, in response to receiving the at least one first bidding from the at least one provider, the at least one first bidding in the data stream of the online conversation, wherein content of the at least one first bidding is inserted into the discussion thread of the online conversation inline with the online conversation of the social group;
presenting on the user interface of the display device, the discussion thread in real-time with the inserted at least one first bidding and at least one selectable element enabling the participants to respond to the at least one first bidding from the at least one provider, the at least one selectable element enabling participants to at least one of accept the at least one first bidding, not accept the at least one first bidding and request a better bidding.

9. The computer program product according to claim 8, wherein the at least one first bidding from the at least one provider comprises:
an offer for goods, services or discounts, related to the context; or
an advertisement or a discount offer, related to the context.

10. The computer program product according to claim 8, wherein the determining the context comprises:
analyzing, by using natural language processing, the online conversation data.

11. The computer program product according to claim 8, wherein the method further comprises:
receiving at least one second bidding from one or more of the at least one provider;
notifying other providers that the one or more of the at least one provider offered the at least one second bidding, the notified other providers not including the one or more of the at least one provider from which the at least one second bidding was received.

12. A method for a bidding process for a social group, the method comprising:
creating the social group whose participants are involved in an online conversation;
determining, based online conversation data, a context of the online conversation;
embedding in real time, in response to determining the context of the online conversation, a request to initiate a real-time bidding interaction in a data stream of the online conversation, wherein content of the request to initiate the real-time bidding interaction is inserted into a discussion thread inline with the online conversation of the social group;
presenting on a user interface of a display device, the discussion thread in real-time with the inserted request to initiate the real-time bidding interaction and selectable elements enabling the participants of the social group to respond to the request to initiate the real-time bidding interaction;
receiving, in response to the request to initiate the real-time bidding interaction, a real-time response from the participants of the social group;
requesting, as a result of the real-time response from participants of the social group, biddings from at least one provider;
receiving, in response to the request for biddings from the at least one provider, at least one first bidding from the at least one provider, the at least one first bidding associated with the determined context of the online conversation, the at least one provider providing at least one item associated with the context of the online conversation;
embedding in real-time, in response to receiving the at least one first bidding from the at least one provider, the at least one first bidding in the data stream of the online conversation, wherein content of the at least one first bidding is inserted into the discussion thread of the online conversation inline with the online conversation of the social group;
presenting on the user interface of the display device, the discussion thread in real-time with the inserted at least one first bidding and at least one selectable element enabling the participants to respond to the at least one first bidding from the at least one provider, the at least one selectable element enabling participants to at least one of accept the at least one first bidding, not accept the at least one first bidding and request a better bidding.

13. The method according to claim 12, wherein the at least one first bidding from the at least one provider comprises:
one or more offers for goods, services or discounts, related to the context; or
one or more advertisements or a discount offer, related to the context.

14. The method according to claim 12, wherein the determining the context comprises:

analyzing, by using natural language processing, the online conversation data.

15. The method according to claim 12, further comprising:
receiving at least one second bidding from one or more of the at least one provider;
notifying other providers that the one or more of the at least one provider offered the at least one second bidding, the notified other providers not including the one or more of the at least one provider from which the at least one second bidding was received.

16. The method according to claim 15, further comprising:
providing an opportunity to the other providers to offer additional second biddings; and
presenting, in the online conversation, the at least one first bidding, the at least one second bidding and any additional second biddings.

17. The method according to claim 16, further comprising:
choosing, by each participant of the social group, one of all the biddings, which include the at least one first bidding, the at least one second bidding and any additional second biddings;
collecting each chosen bidding;
determining a bidding, among the collected chosen biddings, which is chosen most by participants in the social group;
transmitting, based on the determined bidding, a request for a payment for the determined bidding and a coupon associated with the determined bidding to the each participant in the social group.

18. The method according to claim 17, wherein validity of the coupon is subject to a total number of the participants in the social group.

19. The method according to claim 15, further comprising:
requesting, by one or more of the participants in the social group, third biddings from the at least one provider.

* * * * *